July 9, 1968
C. W. HARGENS III
ANALOG-TO-DIGITAL ENCODER APPARATUS
AND SYSTEM EMPLOYING SAME
Filed Sept. 24, 1964
3,392,381
3 Sheets-Sheet 2
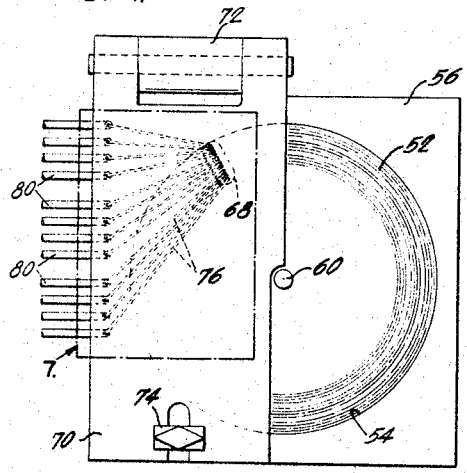
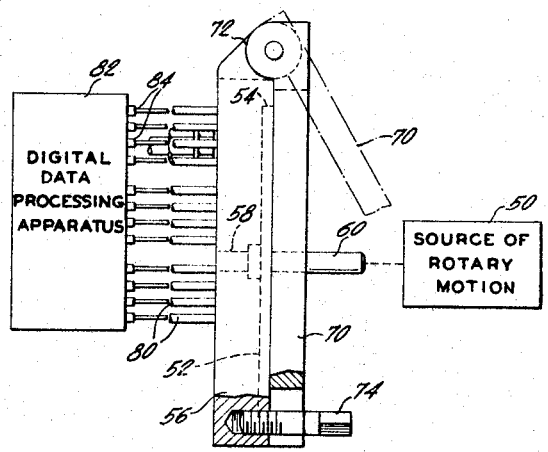
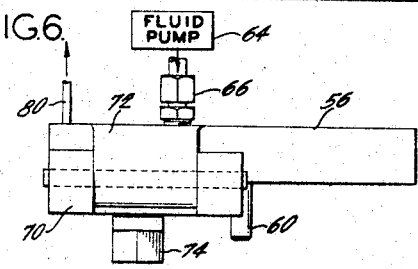
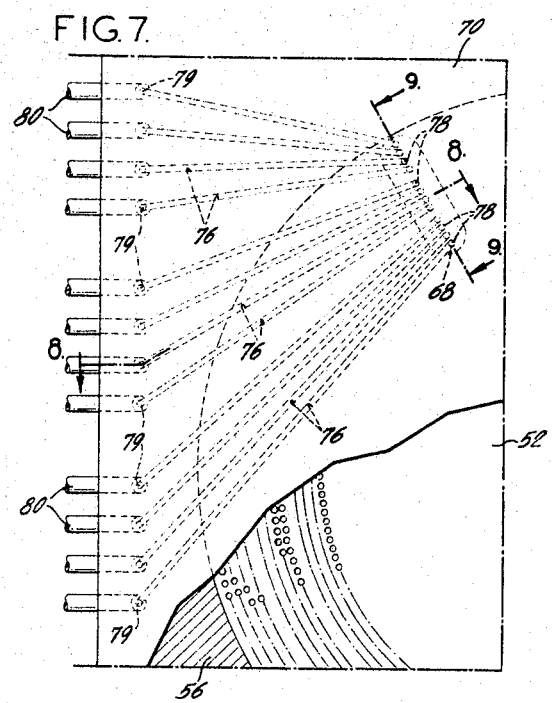
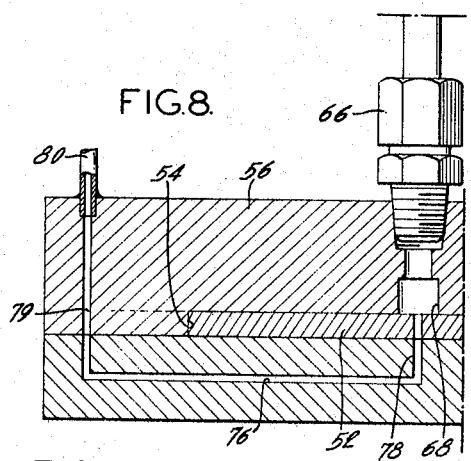
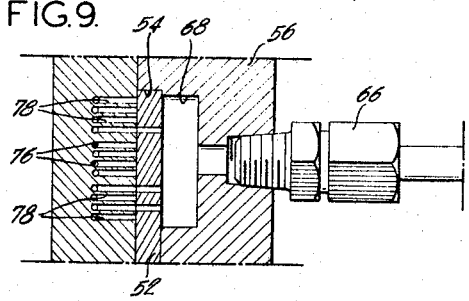
INVENTOR:
CHARLES W. HARGENS III
BY Howson & Howson
ATTYS.

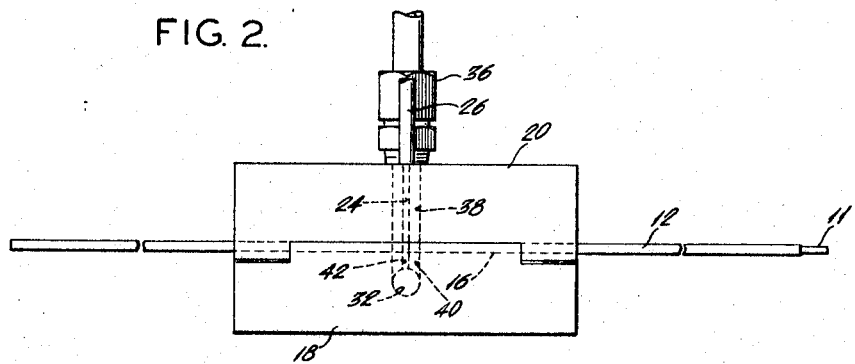
FIG. 2.
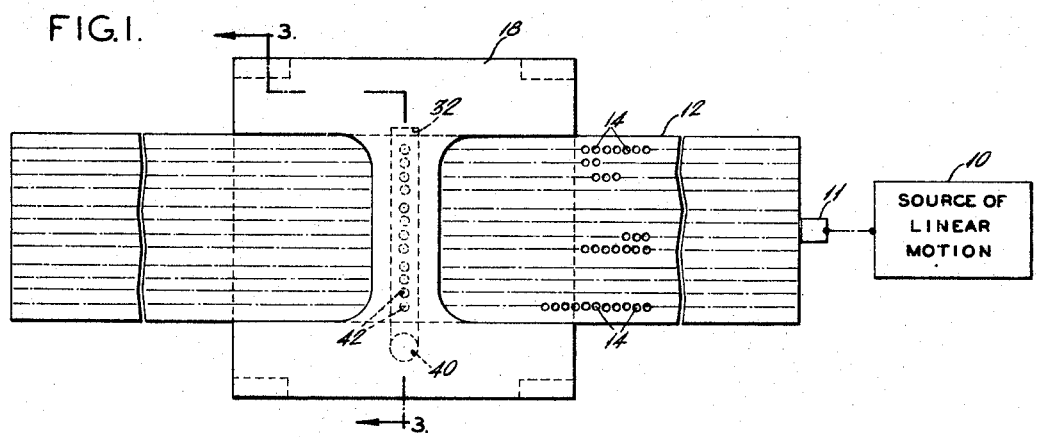
FIG. 1.
FIG. 3.
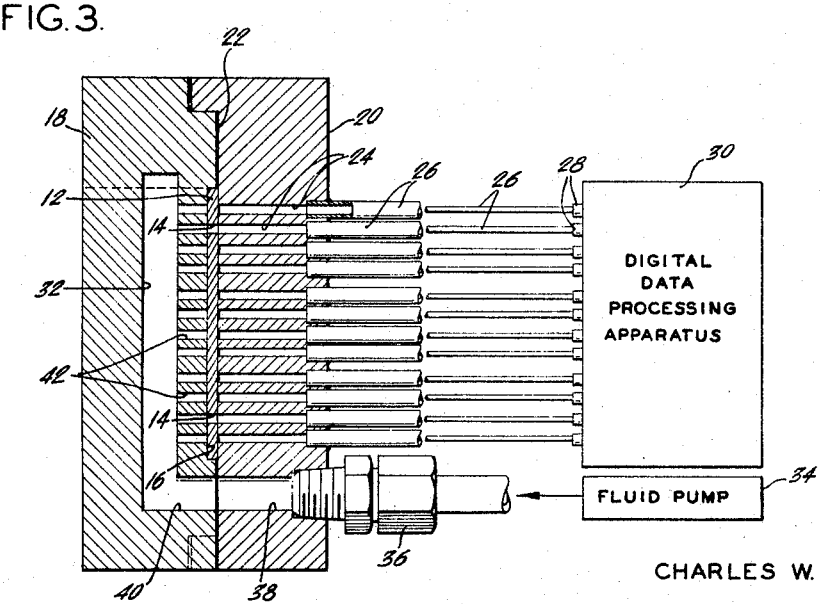
INVENTOR:
CHARLES W. HARGENS III
BY Howson & Howson
ATTYS.

July 9, 1968
C. W. HARGENS III  
ANALOG-TO-DIGITAL ENCODER APPARATUS  
AND SYSTEM EMPLOYING SAME
3,392,381
Filed Sept. 24, 1964
3 Sheets-Sheet 3
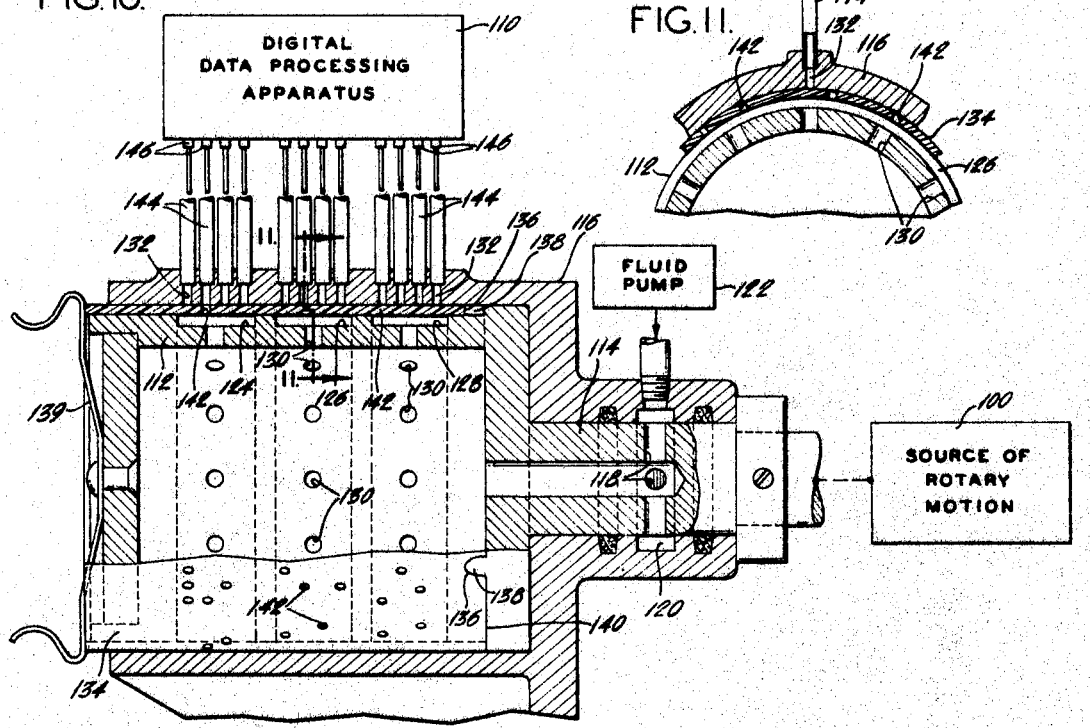
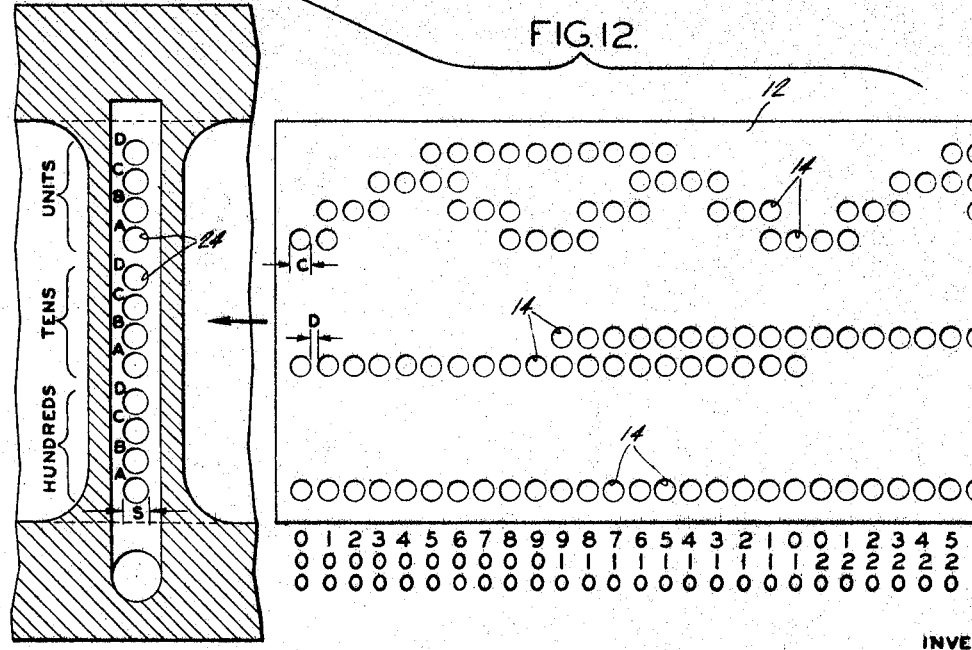
INVENTOR:  
CHARLES W. HARGENS III  
BY *Howson & Howson*  
ATTYS.

United States Patent Office 3,392,381
Patented July 9, 1968

3,392,381
ANALOG-TO-DIGITAL ENCODER APPARATUS
AND SYSTEM EMPLOYING SAME
Charles W. Hargens III, Philadelphia, Pa., assignor to The Franklin Institute, Philadelphia, Pa., a corporation of Pennsylvania
Filed Sept. 24, 1964, Ser. No. 398,952
5 Claims. (Cl. 340—347)

ABSTRACT OF THE DISCLOSURE

Position of an input member is encoded as parallel digital information in fluid-pressure form by utilizing the motion of the input member to move an apertured coding slide between a fixed source of fluid under pressure and a plurality of fluid receiving ports aligned with the portion of the slide containing the coding apertures. For linear input motion, the slide is translatable along a straight line, and for rotary input motion a rotatable disc or cylinder may be used. Preferably the pattern of coding apertures is such that the group of them transmitting fluid differs by one for each successive increment of position of the input object; the dimension of each receiving port along the direction of motion of the coded-aperture member is substantially equal to the sum of the dimension of each of the apertures along the direction of motion plus the distance between immediately adjacent apertures; and the coded-aperture member is preferably spaced slightly from the fluid-detecting system to provide an air bearing for supporting the coded-aperture member.

---

This invention relates to apparatus for encoding analog information in digital form, and to systems in which digital data-processing equipment is operated in response to such apparatus. More particularly, it relates to such encoding apparatus especially suited for operating digital data-processing equipment of the so-called "pure fluid" type.

A variety of known systems have been utilized in the past for controlling, measuring, indicating or computing purposes which employ data-processing apparatus responsive to input signals providing information in digital form. In many cases, however, the original information to which the data-processing equipment is to respond is in so-called analog form, e.g. may comprise the angular or linear position of a shaft. For example, the analog information may comprise the angular or linear position of a shaft connected to a control surface of an aircraft, such as a tail surface or aileron; in other examples the original source of information may be the position of an indexing plate on a lathe, a crank operated by a pneumatic bellows, or a gear in a gear box of a machine. In such systems it becomes necessary to provide apparatus for converting the original analog information into digital form for application to the digital data-processing apparatus so that the latter apparatus may operate properly.

In typical prior-art systems the data-processing apparatus is electronic in nature, and the encoder for translating the analog information into digital form typically comprises electrical brush-and-contact arrangements, photoelectric-optical arrangements or magnetic recording arrangements, as examples. While such encoding apparatus is suitable for operating electronic data-processing systems, it possesses certain inherent drawbacks when utilized to provide digital input information to data-processing apparatus of the type utilizing so-called "pure fluid" elements and systems. In the latter type of systems, the signals employed are generally pressures in a fluid such as air or water, rather than voltages. A large variety of logic elements for computer and control purposes are now known which employ such pure-fluid principles of construction and operation, and which are especially advantageous in certain applications where severe nuclear radiation, strong vibration or shock, and/or substantial variations in temperature would interfere with the operation of an analogous electrical system.

While it is possible to supply input signals to pure-fluid data-processing apparatus by means of known analog-to-digital encoders followed by appropriate transducers for converting the encoder signals into pressure signals in a fluid, such an arrangement militates against use of a system which is entirely of the pure-fluid type with its attendant advantages, and in addition requires the use of special transducers for each digital channel.

Accordingly it is an object of the invention to provide a new and useful analog-to-digital encoder apparatus, and a system employing the same.

Another object is to provide such an encoder and system which does not require electrical equipment or electro-acoustical transducers.

A further object is to provide a new and useful pure-fluid analog-to-digital encoder.

A further object is to provide such an encoder which responds to analog information in mechanical form to produce corresponding parallel digital indications thereof in the form of pressure variations in a fluid.

These and other objects and features of the invention are achieved by the provision of a system employing an analog-to-digital encoder comprising a plurality of separate fluid ports, a source of fluid under pressure for supplying fluid to said ports and a coded-aperture member intervening between said source of fluid and said ports and having a coded pattern of separate apertures extending therethrough, the coded-aperture member being movable with respect to the ports so as to expose predetermined different combinations of said ports to said source of fluid pressure for different corresponding positions of said coded-aperture member. The plurality of fluid ports are connected to the input connections of a parallel-input digital-processing apparatus, so that, for different positions of the coded-aperture member, predetermined different combinations of input connections to the data-processing apparatus are supplied with fluid-pressure signals. The position of the coded-aperture member is controlled by the position of an input member the position of which it is desired to represent in digital form.

As a result, there is obtained a pure-fluid analog-to-digital encoder having among its advantages that it does not require electronic parts or moving mechanical parts, other than the moving coded-aperture member; further, when the encoder is utilized with a data-processing apparatus of the pure-fluid logic type the entire system can be of the pure-fluid type, with the attendant advantages mentioned hereinbefore.

The type of motion of the input member which can be monitored by the novel encoder of the invention may have any of a large variety of forms; for example, it may be linear in the sense of progressing along a straight line, or it may be rotary. In various species of the invention described hereinafter in detail, the coded-aperture member may be in the form of a slidable plate for use with a linear input motion, or in the form of a rotating disc or cylinder in the case of an angular input motion. The coding arrangement employed is preferably of a "unit-distance" type for which each successive change in the combination of ports supplied with fluid is accomplished by adding or removing only one port. This not only avoids possible ambiguities in indication which can otherwise arise if more than one port is switched at a time and the switching is not perfectly accurate, but also minimizes the amount of fluid switched, thus contributing to stability of pressure in the system and minimizing vibrations and other transient phenomena. In a preferred form, the dimension S of the ports along the direction of motion of the coded-aperture member is substantially equal to the sum of the dimension C of each aperture along said direction of motion plus the distance D between immediately-adjacent code apertures in the direction of said motion, for reasons indicated hereinafter.

Other objects and features of the invention will be more readily understood from a consideration of the following detailed description, taken in connection with the accompanying drawings, in which:

FIGURES 1 and 2 are a side elevation and plan view respectively of a preferred embodiment of one form of the invention;

FIGURE 3 is a sectional view taken along line 3—3 of FIGURE 1;

FIGURE 4 is a side elevation view, FIGURE 5 is an end view and FIGURE 6 is a bottom view of another embodiment of the invention;

FIGURE 7 is an enlarged view of a portion of the apparatus of FIGURE 4;

FIGURES 8 and 9 are sectional views taken along the lines 8—8 and 9—9 of FIGURE 7 respectively;

FIGURE 10 is a side elevation view, partly in section and partly broken away, illustrating another embodiment of the invention;

FIGURE 11 is a fragmentary sectional view taken along the line 11—11 of FIGURE 10; and FIGURE 12 is a sectional view of a portion of apparatus suitable for use in the embodiment shown in FIGURE 1 and showing a form of coding which it is preferred to use.

Referring now by way of example only to the embodiment of the invention represented in FIGURES 1, 2 and 3, there is shown in block form a source of linear motion 10, which may for example comprise a linear solenoid armature, a hydraulic plunger, or a piston of a machine. The source of linear motion 10 is mechanically connected to an input member 11 at one end of a coded-aperture member which in this case comprises coded slide strip 12, so that slide strip 12 moves horizontally as shown in FIGURE 1 in response to linear motion of source 10. Slide strip 12, which may for example be of metal or plastic, has a plurality of apertures such as 14 extending therethrough and arranged in horizontal rows and vertical columns as viewed in FIGURE 1 and as will be shown and described in detail in connection with FIGURE 12 hereof.

Slide strip 12 is slidably mounted in a recess 16 between a front plate 18 and a rear plate 20, preferably so that the front and rear surfaces of the slide strip 12 slide over the adjacent faces of both the front and rear plates 18 and 20. In the particular embodiment shown, the recess 16 is formed in front plate 18 and slide strip 12 is seated within the recess with its front surface disposed against the bottom of the recess and its rear surface substantially flush with the edges of the recess. The front plate 18 may be secured to the rear plate 20 by means of an appropriate cement 22; for example, if the front and rear plates 18 and 20 are of plastic the cement 22 may be an epoxy cement.

The rear plate 20 is provided with a plurality of fluid-outlet ports such as 24 each extending horizontally entirely through the rear plate, one above the other. In this example there are twelve such ports arranged directly above each other in three groups of four each. The rear of each fluid-outlet port 24 is connected by a corresponding separate tube such as 26 to a corresponding fluid-inlet port such as 28 of the digital data-processing apparatus 30.

Front plate 18 contains an upwardly-extending manifold or chamber 32 supplied with fluid under pressure from a fluid pump 34, by way of an appropriate fitting 36 and mutually-aligned horizontal channels 38 and 40 in plates 20 and 18, respectively, which provide communication to the lower end of manifold 32. The fluid utilized may typically be air or water, and the techniques of fabrication and details of operation to be observed here and throughout the encoder structure are similar to those employed in pure-fluid amplifier and switching circuits using similar fluids.

The bottom of recess 16, which constitutes the left-hand side of the guide-way for the slide strip 12 as viewed in FIGURE 3, is supplied with fluid under pressure from manifold 32, in this example by way of the twelve fluid-inlet ports such as 42. Each one of the fluid-inlet ports 42 is aligned with a corresponding different one of the fluid-outlet ports 24 on the opposite side of the slide strip 12, so that fluid under pressure can flow from any one of the inlet ports such as 42 to any one of the outlet ports such as 24 when and only when an aperture in the slide strip 12 is disposed between the adjacent ends of the two corresponding inlet and outlet ports. The coding apertures 14 in slide strip 12 are preferably arranged so that, as slide strip 12 is moved through recess 16, different combinations of outlet ports such as 24 are exposed to the fluid under pressure at fluid-inlet ports 42 for different successive positions of the slide strip. It will be understood that each time one of the fluid-outlet ports 24 is exposed to the fluid under pressure from a corresponding inlet port such as 42, a resultant increase in fluid pressure is produced in that fluid-outlet port and is conveyed by a corresponding tube such as 26 to the corresponding separate inlet port, such as 28, of the digital data-processing apparatus 30. Accordingly, for each successive increment of linear motion of slide strip 12 a different and predetermined combination of the inlet ports such as 28 of the data-processing apparatus is supplied with a pressure signal.

The information input to the digital data-processing apparatus 30 therefore comprises binary-coded digital information in the form of pressure variations indicative of the linear position of slide strip 12, and hence of the source of linear motion 10. While this parallel input signal may be transformed to electrical form by utilizing electro-acoustical transducers for each of the fluid input ports 28 to convert the pressure variations to voltage variations, and the data-processing apparatus constructed in usual electronic form, the invention is particularly advantageous when embodied in a system in which the data-processing apparatus is itself of the pure-fluid type. For example, each fluid inlet 28 may be connected internally of the data-processing apparatus to a control jet of a pure-fluid amplifier or pure-fluid switching element.

FIGURE 12, to be described in further detail hereinafter, shows in more detail a typical type of aperture and outlet-port arrangement which may be utilized in the embodiment of the invention shown in FIGURE 1. Generally, it can be seen from FIGURE 12 that the apertures on slide member 12 are arranged in a number of horizontal rows, in this case twelve, equal to the number of fluid-outlet ports such as 24, each horizontal line of apertures being positioned so that the centers of the apertures move successively and progressively through alignment with the centers of the corresponding fluid-outlet ports when strip 12 is moved linearly in its horizontal path. The apertures 14 are also arranged in vertical columns so that when any given vertical column of apertures is aligned with the fluid-outlet ports 24 a particular combination of the outlet ports receives fluid pressure, while when the slide strip 12 is advanced so that the next vertical column of apertures is aligned with the outlet ports, a different combination of ports is supplied with pressure. The particular combination of apertures aligned with the fluid-outlet ports is a coded indication of the position of the slide strip 12.

In the embodiment of the invention illustrated in FIGURES 4 through 9, the information which is to be represented in digitally-coded form comprises the angular position of a source of rotary motion 50. As examples, the source of rotary motion may comprise an angularlymovable control surface of an aircraft, a shaft in the gear box of a machine, or any of a large number of other rotatable elements.

In this example the coded-aperture member is in the form of a circular disc 52, disposed within a closely-fitting circular recess 54 in the front surface of a rear plate 56 and mounted for rotation with respect to the rear plate by means of a supporting stub shaft 58 journalled in a cylindrical opening in plate 56. A centrally-located horizontally-extending input shaft 60 is connected to the source of rotary motion 50 to rotate in response thereto.

Apertured disc 52 is provided with a coded pattern of apertures circumferentially and radially arranged near the outer margin of the disc. Preferably the apertures are disposed in different sets along different radii of the disc; for example, the apertures along each successive radius may have a number and location corresponding to the apertures in successive vertical columns of the code pattern illustrated in FIGURE 12.

Fluid under pressure is supplied by fluid pump 64 by way of a suitable fitting 66 to a manifold or chamber 68 located in rear plate 56 and of a dimension to extend radially completely across the region in which the apertures in disc 52 are disposed, as shown particularly clearly in FIGURE 9 for example. The disc 52 bears against the edges of manifold 68 but is slidably rotatable with respect thereto, so that as disc 52 is turned those apertures therein which are disposed adjacent manifold 68 are supplied with fluid pressure at their rear sides.

A hinged front plate 70 is positioned over a portion of the rear plate and of the disc 52 opposite the manifold 68. To provide for easy removal and insertion of the disc 52, a hinge 72 is provided on rear plate 56 and the front plate depends therefrom. A manual locking and unlocking arrangement 74 may be provided to lock and clamp the front plate in its downward position in which it is held against the front face of disc 52 with a pressure permitting easy rotation of the disc.

Front plate 70 contains channels such as 76 therein in a number equal to the maximum number of apertures along any radius of disc 52, in this example twelve. Each of the channels such as 76 has an inner end such as 78 serving as a fluid-outlet port, and these ports are preferably all arranged along a common radius of disc 52. As is shown particularly clearly in FIGURE 8, each channel such as 76 extends from its fluid-outlet port immediaely adjacent the front surface of the disc 52, through front plate 70 toward the edge thereof, and then backward to the inner surface of rear plate 56, whence a corresponding aligned channel such as 79 extends rearwardly to the exterior into communication with fluid conduits or pipes such as 80, one for each of the channels 79.

In operation, the fluid pump 64 applies pressure by way of manifold 68 to the rear surface of disc 52 containing the coded-aperture arrangement, directly opposite the fluid outlet ports such as 78. Depending upon the angular orientation of disc 52, and hence upon the orientation of input shaft 60 and the source of rotary motion 50, fluid pressure will be communicated to a particular combination of fluid outlets characteristic of that angular position, whence the fluid pressure will be communicated by way of channels such as 76 and 79 and the pipes such as 80 to the digital data-processing apparatus 82 at its fluid-inlet ports such as 84. A particular combination of the fluid inlets such as 84 of data-processing apparatus 82 is therefore supplied with fluid pressure for each angular position of the source of rotary motion 50, thereby providing to the data-processing apparatus binary-coded digital input information indicative of the angular position of the source of rotary motion 50.

The embodiment of the invention illustrated in FIGURES 10 and 11 is again operaive to respond to angular motion of a source of rotary motion 100 to supply parallel binary-coded information as to angular position of source 100 to the input of digital data-processing apparatus 110, but in this example the coded-aperture member is generally cylindrical in form and the fluid outlets for receiving fluid under pressure from the apertures in the coded-aperture member are disposed along a generally cylindrical surface.

More particularly, there is provided a rotatable cylindrical drum 112 having a hollow shaft 114 journalled for rotational motion and for support in a cylindrical supporting member 116. Hollow shaft 114 is provided with a plurality of openings 118 extending from the interior thereof to a surrounding circular groove 120 in supporting member 116, to which groove 120 fluid under pressure is supplied from a suitable fluid pump 122. The larger cylindrical portion of drum 112 is provided at its exterior with annular grooves 124, 126 and 128 each of which communicates with the interior of the drum by way of a plurality of holes such as 130. The interior of the drum is otherwise sealed against fluid pressure, so that fluid under pressure from pump 122 flows through groove 120, openings 118, the hollow interior of shaft 114, the interior of the enlarged portion of drum 112 and the holes such as 130 to each of the annular grooves 124, 126 and 128. The source of rotary motion 100 is mechanically connected to the hollow shaft 114, and the above-described fluid communication between pump 122 and the annular grooves 124, 126 and 128 is maintained for all angular positions of source 100 and shaft 114.

Disposed in an axially-extending line with each other along the inner cylindrical surface of supporting member 116 are a plurality of fluid-outlet ports such as 132, in this case twelve in number, each of which is directly opposite one of the annular grooves, 124, 126 and 128. Contained in an outer recess in drum 112 is a cylindrical coded-aperture member which separates the annular grooves 124, 126 and 128 from the fluid-outlet ports such as 132. The cylindrical coded-aperture member 134 fits closely over drum 112 and is held in fixed angular position with respect thereto by means of indexing slots such as 136 in the coded-aperture member which cooperate with three corresponding indexing fingers such as 138 on the exterior of drum 112. Just sufficient clearance is provided between the interior of supporting member 116 and the exterior of coded-aperture member 134 to permit free rotation between them. A leaf spring 139 may be provided at the left end of drum 112 as shown in FIGURE 10, to urge coded-aperture member 134 into a fixed axial position in which it abuts against a shoulder 140 on drum 112. By squeezing the ends of spring 139 radially inwardly, the coded-aperture member 134 or others like it may readily be inserted and removed from position on drum 112.

Coded-aperture member 134 is provided with a plurality of apertures such as 142 extending therethrough and arranged in a predetermined pattern; preferably the pattern consists of twelve circumferentially-extending sets of apertures corresponding to the twelve horizontal rows of apertures in FIGURE 12, these circumferentially-extending sets being axially displaced from each other and each axially aligned with a different one of the fluid-outlet ports such as 132. Each of the fluid ports such as 132 is connected by a separate corresponding pipe such as 144 to a separate corresponding fluid inlet such as 146 of the digital data-processing apparatus 110.

In operation, fluid pressure is maintained within the annular grooves 124, 126 and 128 by fluid pump 122 in the manner described hereinbefore and is applied by way of the apertures in coded-aperture member 134 to a different combination of fluid-outlet ports such as 132 for different angular positions of shaft 114 and of the source of rotary motion 100. As a result a corresponding predetermined combination of the inlet ports 146 of the data-processing apparatus 110 is supplied with fluid pressure for each particular angular position of the source of rotary motion 100. The digital data-processing apparatus 110 is therefore supplied at its input with pressure signals comprising parallel binary-coded digital information as to the angular position of source 100, which information may be utilized by the data-processing apparatus 110 in any conventional manner, as indicated hereinbefore.

FIGURE 12 illustrates in detail one suitable aperture coding arrangement for the slide strip 12 of embodiment of the invention described in connection with FIGURES 1–3, and the same general coding system can be utilized in the arrangement of FIGURE 10 by in effect curling the strip 12 lengthwise to form a cylinder; in applying the coding arrangement to the embodiment of FIGURES 4–9, each of the vertical columns of the pattern would correspond to a different radial line on the disc 52 of FIGURE 4.

For convenience in explanation, the fluid-outlet ports such as 24 in FIGURE 12 have been divided into three sets of four, the ports of each of the three sets being labelled A, B, C and D in order extending upwardly. It will be understood that the horizontal position of the slide strip 12 with respect to a reference position can be specified by an ordinary Arabic numeral indicating directly the displacement of the strip with respect to the reference position, and in the coding arrangement now to be described the combination of the lower group of four outlet ports which is supplied with pressure represents the hundreds digit in that numeral; similarly, the tens digit of the numeral is represented by that combination of the next four outlet ports which is supplied with pressure, while the units digit of the numeral is represented by that combination of the top four outlet ports which is supplied with pressure. Those outlet ports which are in fact supplied with pressure at a given time, as described above, depends upon which are permitted to receive fluid pressure by way of the apertures in the slide strip 12, and hence upon the position of the slide strip.

As can be seen from FIGURE 12, when the slide strip 12 is advanced linearly to the left so that the first, or leftmost, vertical column of apertures is aligned with the fluid-outlet ports, the only fluid-outlet ports receiving pressure will be the A outlet of the hundreds group, the A outlet of the tens group and the A outlet of the units group. Thus the number of hundreds in the total number represented by the position of the slide strip 12 may then be represented as A – – –; the number of tens by A – – –; and the number of units by A – – –. When the slide strip 12 has been advanced to the left by an increment such that the second column of apertures is aligned with the fluid-outlet ports, the hundreds, tens and units digits may be represented as A – – –, A – – –, and AB – –. Each successive combination of fluid-outlet ports supplied with pressure differs from its predecessor only in the addition or removal of one of the apertures in that column, and the coding arrangement is therefore of the unit-distance type. A particular code pattern for accomplishing this is indicated by the following table, in which the first column headed $N_A$ indicates the Arabic number representing the analog linear position of slide strip 12; $N_{CD}$ indicates the corresponding coded decimal number; "100's" indicates the code for the 100's digits; the column headed "10's" indicates the code for the 10's digit; and the column headed "units" indicates the code for the units digit. This type of code is known as a cyclic decimal code. The table does not show all of the numbers from zero upward, but instead shows selected numbers which illustrate fully the manner and system in which the code proceeds for progressively higher numbers.

| $N_A$ | $N_{CD}$ | 100's | 10's | Units |
|---|---|---|---|---|
| 0 | 000 | A – – – | A – – – | A – – – |
| 1 | 001 | A – – – | A – – – | AB – – |
| 2 | 002 | A – – – | A – – – | – B – – |
| 3 | 003 | A – – – | A – – – | – BC – |
| 4 | 004 | A – – – | A – – – | – – C – |
| 5 | 005 | A – – – | A – – – | – – CD |
| 6 | 006 | A – – – | A – – – | – BCD |
| 7 | 007 | A – – – | A – – – | – B – D |
| 8 | 008 | A – – – | A – – – | AB – D |
| 9 | 009 | A – – – | A – – – | A – – D |
| 10 | 019 | A – – – | AB – – | A – – D |
| 11 | 018 | A – – – | AB – – | AB – D |
| 12 | 017 | A – – – | AB – – | – B – D |
| 19 | 010 | A – – – | AB – – | A – – – |
| 20 | 020 | A – – – | – B – – | A – – – |
| 21 | 021 | A – – – | – B – – | AB – – |
| 29 | 029 | A – – – | – B – – | A – – D |
| 30 | 039 | A – – – | – BC – | A – – D |
| 31 | 038 | A – – – | – BC – | AB – – D |
| 99 | 090 | A – – – | A – – D | A – – – |
| 100 | 190 | AB – – | A – – D | A – – – |
| 101 | 191 | AB – – | A – – D | AB – – |
| 109 | 199 | AB – – | A – – D | A – – D |
| 110 | 189 | AB – – | AB – D | A – – D |
| 111 | 188 | AB – – | AB – D | AB – D |
| 199 | 100 | AB – – | A – – – | A – – – |
| 200 | 200 | – B – – | A – – – | A – – – |
| 201 | 201 | – B – – | A – – – | AB – – |

Because of the use of this type of code for the aperture arrangement, the amount of fluid which must be switched on and off in a given interval is held to a minimum, since only one aperture is added to it or removed from alignment with the fluid-outlet ports for each successive position of the slide strip 12. Such an arrangement introduces additional stability into the operation of the system, minimizes transient effect upon the fluid pressure, and reduces the tendency for mechanical vibration or other transient effects in the apparatus. Importantly, such a unit-distance coding arrangement avoids the ambiguity which may arise in other systems in which more than one aperture would be added or subtracted at a time; in the latter arrangement unavoidable small misalignments may cause different ones of the plurality of added apertures to come into effect at slightly different times, producing at least momentarily an improper indication of the actual coded number intended to be represented. As pointed out above, this same type of code can be applied to the other embodiments of the invention described in detail hereinbefore.

Another type of code which may be employed advantageously is a cyclic binary code of the type known in the computer field as a Gray code. The apertures may be other than circular, for example rectangular.

In a preferred arrangement found to be advantageous the length S of each fluid-outlet port in the direction of motion of the coded apertures is substantially equal to the sum of the diameter C of each code aperture in the direction of said motion plus the distance D between immediately adjacent apertures measured along said direction. With this arrangement the flow of fluid will not pulsate unduly or excessively.

In the forms of the invention specifically described, the coded-aperture member may slide against its adjacent members as mentioned above, so as to minimize lateral fluid leakage between the relatively-moving members. However, to reduce drag on the coded-aperture member the principle of an air-bearing may be utilized to minimize or substantially eliminate such drag by leaving a small space between the coded-aperture member and the adjacent member, thereby providing a thin film of rapidly moving fluid flowing around the surfaces of the coded-aperture member to support it; this will not prevent the normal operation of selective flow through only particular outlet ports, and will merely introduce a small amount of background "noise" in the coded signals from the outlet ports.

While the invention has been described with particular reference to specific embodiments thereof in the interests of complete definiteness, it will be understood that it can be embodied in any of a large variety of diverse forms without departing from the spirit and scope of the invention as defined by the appended claims.

I claim:

1. A system for producing signals in response to motion of an object, comprising:

a movable input member connectable to an object so as to move therewith;

a movable coded-aperture member connected to said input member to move therewith and having a plurality of fluid-transmissive apertures therethrough arranged in a predetermined digitally-coded pattern disposed along and transverse to its direction of motion;

means for applying fluid under pressure to one side of said coded-aperture member;

a fluid-outlet assembly including a plurality of fluid-outlet ports disposed in a predetermined pattern adjacent the other side of said coded aperture member whereby different combinations of said ports receive said fluid under pressure by way of said apertures for different positions of said input member; and digital data-processing means having pressure-responsive signal input means connected to said fluid-outlet ports, whereby said data-processing means is supplied with different digitally-coded information for different positions of said objects;

said pattern of apertures in said coded-aperture member being such that the number of said fluid-outlet ports receiving fluid by way of said apertures differs by one for immediately-successive increments of position of said object.

2. A system for producing signals in response to motion of an object, comprising:

a movable input member connectable to an object so as to move therewith;

a movable coded-aperture member connected to said input member to move therewith and having a plurality of fluid-transmissive apertures therethrough arranged in a predetermined digitally-coded pattern disposed along and transverse to its direction of motion;

means for applying fluid under pressure to one side of said coded-aperture member;

a fluid-outlet assembly including a plurality of fluid-outlet ports disposed in a predetermined pattern adjacent the other side of said coded aperture member whereby different combinations of said ports receive said fluid under pressure by way of said apertures for different positions of said input member; and digital data-processing means having pressure-responsive signal input means connected to said fluid-outlet ports, whereby said data-processing means is supplied with different digitally-coded information for different positions of said object;

the dimension of each of said fluid-outlet ports along the direction of said motion of said coded-aperture member being substantially equal to the sum of the dimension of each of said apertures along said direction plus the distance between immediately adjacent ones of said apertures.

3. A system for producing signals in response to motion of an object, comprising:

a movable input member connectable to an object so as to move therewith;

a movable coded-aperture member connected to said input member to move therewith and having a plurality of fluid-transmissive apertures therethrough arranged in a predetermined digitally-coded pattern disposed along and transverse to its direction of motion;

means for applying fluid under pressure to one side of said coded-aperture member;

a fluid-outlet assembly including a plurality of fluid-outlet ports disposed in a predetermined pattern adjacent the other side of said coded aperture member whereby different combinations of said ports receive said fluid under pressure by way of said apertures for different positions of said input member; and digital data-processing means having pressure-responsive signal input means connected to said fluid-outlet ports, whereby said data-processing means is supplied with different digitally-coded information for different positions of said object;

said pattern of apertures in said coded-aperture member being such that the number of said fluid-outlet ports receiving fluid by way of said apertures differ by one for immediately-successive increments of position of said object;

the dimension of each of said fluid-outlet ports along the direction of said motion of said coded-aperture member being substantially equal to the sum of the dimension of each of said apertures along said direction plus the distance between immediately adjacent ones of said apertures.

4. An analog-to-digital encoder, comprising:

a coded-aperture member of generally hollow cylindrical form rotatable about its cylinder axis and having a plurality of apertures through its wall disposed in a predetermined coded pattern circumferentially and axially thereof;

means for applying fluid under pressure to one side of said apertures; and a fluid-outlet assembly having a plurality of fluid-outlet ports disposed over a generally-cylindrical surface concentric with said coded-aperture member adjacent the other side of said apertures so that different combinations of said outlet ports are alignable to receive fluid under pressure by way of said apertures for different angular positions of said member.

5. Apparatus in accordance with claim 4, in which said coded-aperture member is located inside said fluid-outlet assembly and has its outer cylindrical surface containing said apertures substantially in contact with the inner cylindrical surface of said fluid-outlet assembly.

References Cited
UNITED STATES PATENTS

| | | | |
|---|---|---|---|
| 2,524,029 | 10/1950 | Carroll et al. | 235—61.117 X |
| 2,632,058 | 3/1953 | Gray | 235 |
| 2,768,335 | 10/1956 | Coley. | |
| 3,114,035 | 12/1963 | Avery | 235—61.117 |
| 3,239,142 | 3/1966 | Levine | 340—347 X |
| 2,822,130 | 2/1958 | Nolde | 235—61 |
| 2,867,797 | 1/1959 | Greene | 340—347 |
| 2,889,109 | 6/1959 | O'Brien | 235—61 |
| 2,905,874 | 9/1959 | Kelling | 318—28 |
| 2,934,824 | 5/1960 | Braybrook | 31—1 |
| 3,020,534 | 2/1962 | Jones | 340—347 |
| 3,058,005 | 10/1962 | Hurvitz | 250—220 |
| 3,100,299 | 8/1963 | Congdon | 340—347 |
| 3,156,912 | 10/1964 | Maclay | 340—347 |
| 3,176,241 | 5/1961 | Hougar | 331—75 |
| 3,218,635 | 11/1965 | Masur | 340—364 |

MAYNARD R. WILBUR, *Primary Examiner.*

J. H. WALLACE, G. R. EDWARDS,
*Assistant Examiners.*